United States Patent
Janky et al.

(10) Patent No.: US 6,775,337 B2
(45) Date of Patent: Aug. 10, 2004

(54) DIGITAL AUTOMATIC GAIN CONTROL WITH FEEDBACK INDUCED NOISE SUPPRESSION

(75) Inventors: William Oscar Janky, Goode, VA (US); Vincent Paul Massaro, Syracuse, NY (US); Thomas Alexander Savage, Lynchburg, VA (US)

(73) Assignee: M/A-Com Private Radio Systems, Inc., Lynchburg, VA (US)

( * ) Notice: Subject to any disclaimer, the term of this patent is extended or adjusted under 35 U.S.C. 154(b) by 497 days.

(21) Appl. No.: 09/682,180

(22) Filed: Aug. 1, 2001

(65) Prior Publication Data

US 2003/0043940 A1 Mar. 6, 2003

(51) Int. Cl.$^7$ .............................................. H04L 27/08
(52) U.S. Cl. .................... 375/345; 455/234.1; 381/94.1
(58) Field of Search ............................... 375/345, 254; 381/107, 108, 94.1, 93; 455/234.1

(56) References Cited

U.S. PATENT DOCUMENTS

| | | | | |
|---|---|---|---|---|
| 4,461,025 A | * | 7/1984 | Franklin | 381/56 |
| 5,016,205 A | * | 5/1991 | Shumway | 708/200 |
| 5,329,243 A | | 7/1994 | Tay | |
| 5,666,384 A | * | 9/1997 | Kuban et al. | 375/285 |
| 5,983,183 A | * | 11/1999 | Tabet et al. | 704/270 |
| 6,212,275 B1 | * | 4/2001 | Akhteruzzaman | 379/421 |

* cited by examiner

*Primary Examiner*—Temesghen Ghebretinsae
(74) *Attorney, Agent, or Firm*—Enrique J. Mora, Esq.; Beusse, Brownlee, Wolter, Mora & Maire, P.A.

(57) ABSTRACT

Method processor and processor-readable medium for reducing the level of feedback-induced noise in the output signal from an audio automatic gain control circuit are provided. The method allows for receiving a stream of pulses comprising an input signal to the automatic gain control circuit. The method further allows for receiving estimates of respective high and low frequency energy components of the input signal. The respective high and low frequency components are averaged, e.g., over a respective sliding window. An energy scalar is calculated based on the ratio of a predefined target energy level over a combined value of the high and low frequency components. A relating action allows to compare the target energy level to the combined value of the high and low frequency components. Based on the comparison results, the calculated energy scalar is limited to within the two limit values. A subsequent relating action allows to compare the values of the averages of the high and low frequency components to one another. If the value of the high frequency average exceeds the value of the low frequency average, the energy scalar is reduced to a value sufficiently low to suppress the presence of feedback-induced noise in the input signal of the circuit, and generate an output signal with a corresponding low level of feedback-induced noise. If the value of the low frequency average exceeds the value of the high frequency average, the energy scalar is applied to the input signal to generate an output signal scaled within the two limit values.

16 Claims, 2 Drawing Sheets

DIGITAL AUTOMATIC GAIN CONTROL WITH FEEDBACK INDUCED NOISE SUPPRESSION

BACKGROUND OF INVENTION

The present invention is generally related to electronic circuits, and, more particularly, to method and processor for reducing the level of feedback-induced noise in an automatic gain control circuit for audio level control in a radio transmitter.

Users of Specialized Mobile Radio (SMR) systems, such as Land Mobile Radio (LMR) systems, etc., commonly used in dispatch applications, where a large number of users may share a single base station, are accustomed to fairly consistent recovered audio levels, especially when using analog frequency modulation (FM) communication techniques. The audio level consistency in this communication technique may be achieved by using an automatic gain control circuit (AGC) in the audio path or by using a combination of amplification and limiting of the FM deviation. This allows for different audio levels applied into the transmitting radio microphone to be received at a somewhat constant level on the receiving radios within the system. With the introduction of digital voice systems, it was noticed that such systems also suffer from the lack of consistency in recovered audio levels. Digital AGC circuits can be used in this case to recover a consistent audio level. However, as further elaborated below, the latency inherent in digital voice systems causes an additional complication. That is, the latency of digital voice systems results in these systems suffering from severe feedback-induced noise when receiving radios are near a transmitting radio. For example, the audio output from the speakers of the receiving radios can be fedback into the transmitting radio microphone causing unacceptable distortion and undesirable increase in gain from the AGC circuit.

When digital voice coders, i.e., digital vocoders, were developed for LMR applications one of the main goals was faithful reproduction of voice. However, differences in operation between analog and digital-based voice communication systems were noticed. Unlike an analog-based system, a digital-based voice system is substantially impervious to the presence of noise in the communications channel, except for bit errors that manifest themselves mainly as audio artifacts and not noise. One known characteristic of vocoders is that, for the most part, they are linear gain devices; essentially whatever level goes into the device, comes out. Thus, if the audio level is low at the transmitting radio microphone input, the audio level will be similarly low at the receiving radio speaker output. Further, vocoders are commonly used in trunked LMR systems where each conversation can consist of multiple transmissions from different users. The received audio level from each user can vary based on a myriad of factors, such as the user's voice level, how they hold the microphone, etc. To compensate for these factors, presently available AGC circuits have proved to be somewhat effective. However, as suggested above, there is also inherent latency in digital speech caused by processing and transmission delays. This latency in some radio systems can be on the order of several hundred milliseconds. The latency aggravates feedback-induced noise when other receiving radios are near the transmitting radio.

Typically in LMR applications, the users do not hold the radio speaker close to their ear. For understandable reasons, users, such as police officers, fire fighting personnel, emergency first aid personnel, operators of vehicle fleets, public utilities personnel, etc, that need unimpeded use of their hands, simply carry their portable radios on a belt-attached holster or equivalent and set their radio sufficiently loud to be able to quickly monitor and respond to communications addressed to a given user or group of users. The speakers on mobile and portable radios can be acoustically loud, and the volume can be turned up high especially in a high background noise environment. In this case, the audio output from the speakers of any neighboring receiving radios can be fedback into the transmitting radio microphone causing severe distortion and undesirable increase in the gain of the AGC circuit and thus compromise the efficacy of such a circuit.

As suggested above, one known approach to ameliorate the lack of consistent audio level is the inclusion of the AGC circuit in the audio path after the microphone. Unfortunately, known AGC circuits generally constitute circuits with fixed gain profile and response time. Typically, these circuits cannot be easily modified to adapt to changing operational conditions. It is believed that prior to the present invention no solution has been proposed to effectively suppress the foregoing feedback-induced noise that has affected LMR systems.

Thus, in view of the foregoing issues it would be desirable to provide digital signal processing techniques that would allow for reducing the level of feedback-induced noise in the output signal from an audio automatic gain control circuit in a radio transmitter while providing a substantially constant audio to that signal.

SUMMARY OF INVENTION

Generally, the present invention fulfills the foregoing needs by providing in one aspect thereof, a method for reducing the level of feedback-induced noise in the output signal from an audio automatic gain control circuit in a radio transmitter. The method allows for receiving a stream of pulses, e.g., PCM audio samples, comprising an input signal to the automatic gain control circuit. The method further allows for receiving estimates of respective high and low frequency energy components of the input signal. The respective high and low frequency components are averaged, e.g., over a respective sliding window. An energy scalar is calculated based on the ratio of a predefined target energy level over a combined value of the high and low frequency components. A relating action relates the target energy level to the combined value of the high and low frequency components. Based on the relating results, the calculated energy scalar is limited to within two limit values. Another relating action relates the values of the averages of the high and low frequency components to one another. If the value of the high frequency average exceeds the value of the low frequency average, the energy scalar is reduced to a value sufficiently low to suppress the presence of feedback-induced noise in the input signal of the circuit, and generate an output signal with a corresponding low level of feedback-induced noise. If the value of the low frequency average exceeds the value of the high frequency average, the energy scalar is applied to the input signal to generate an output signal scaled within the two limit values.

The present invention further fulfills the foregoing needs by providing in another aspect thereof, a processor for reducing the level of feedback-induced noise in the output signal from an audio automatic gain control circuit in a radio transmitter. The processor includes at least one port for receiving a stream of pulses comprising an input signal to the automatic gain control circuit, and for receiving respective estimates of high and low frequency energy components of the input signal. An averaging module is configured to average the respective high and low frequency components over a respective sliding window. A calculating module is configured to calculate an energy scalar based on the ratio of a predefined target energy level over a combined value of the high and low frequency components. A comparator is configured to relate the target energy level to the combined value of the high and low frequency components. A limiter is responsive to the comparator to limit the calculated energy scalar to a range between two limit values based on the relating results from the comparator. A comparator allows relating the values of the averages of the high and low frequency components to one another. A noise-reduction processing module is responsive to the comparator for relating the values of the averages of the high and low frequency components to one another to perform the following actions:

If the value of the high frequency average exceeds the value of the low frequency average, reducing the set energy scalar to a value sufficiently low to suppress the presence of feedback-induced noise in the input signal of the circuit, and generate an output signal with a corresponding low level of feedback-induced noise; and If the value of the low frequency average exceeds the value of the high frequency average, applying the energy scalar from the limiter to the input signal to generate an output signal scaled within the two limit values.

BRIEF DESCRIPTION OF DRAWINGS

The features and advantages of the present invention will become apparent from the following detailed description of the invention when read with the accompanying drawings in which.

DETAILED DESCRIPTION

Figure 1:
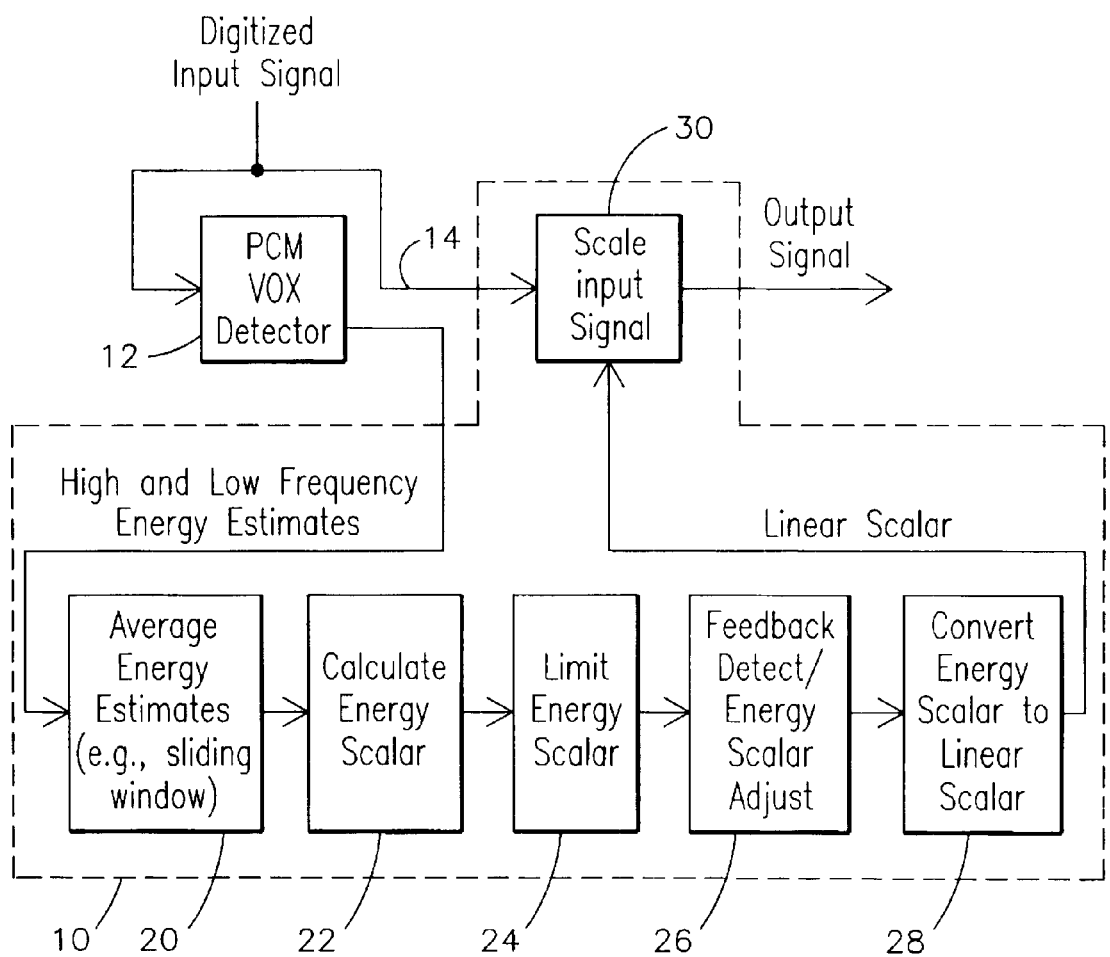
FIG. 1 shows a flow diagram of a method for reducing the level of feedback-induced noise in the output signal from an audio automatic gain control circuit in accordance with aspects of the present invention.

FIG. 1 illustrates in block diagram representation an exemplary flow of actions and/or signals affected by such actions, as may be used for practicing a method for reducing the level of feedback-induced noise in the output signal from an audio automatic gain control (AGC) circuit/process 10 in a digital radio transmitter that may be part of a mobile radio system. As will be readily understood by those skilled in the art, such radios generally use a vocoder or voice coder including a CODEC (COder/DECoder) device 8 (FIG. 2) for converting an analog speech waveform into a digital signal, based on a digital modulation technique, such as a Pulse-Code Modulation (PCM) or any other suitable digital modulation technique. In one exemplary embodiment, the vocoder used is the commercially available Improved Multiband Excitation Vocoder (IMBE) made by Digital Voice Systems Incorporated (DVSI).

In the mobile radio, a VOX detector 12 processes in conventional fashion a stream of pulses, e.g., 20 mSec samples of PCM data from the CODEC device, based on the analog speech waveform. The stream of pulses comprises a digitized input signal supplied to the AGC circuit by way of a first input port 14. As will be readily understood by those skilled in the art, a VOX detector is essentially a voice-activated device, and in one exemplary embodiment is part of the IMBE vocoder. The VOX detector includes appropriate digital filters for estimating respective low-frequency (LF) and high-frequency (HF) energy components in the digitized input signal. In one exemplary embodiment, the low-frequency energy components may comprise spectral components in the range from DC up to about one kHz, and the high-frequency energy components may comprise spectral components above one kHz. It will be appreciated that the foregoing ranges are provided by way of illustration and should not be construed as limiting being that other ranges could be used equally effective depending on the requirements of a given application. As shown at block 20, the energy estimates from the VOX Detector 12 are input to the AGC circuit/process 10 via respective input ports 16 and 18 (FIG. 2) to be averaged using, for example, a well-known sliding window averaging technique. In one exemplary embodiment, in order to get a faster response to changes in the HF energy components for reasons further elaborated below, the width of the sliding window used for averaging the HF energy components is narrower than the width of the sliding window used for averaging the LF energy components. For example, the respective sliding window averages may be calculated using the last 16 LF energy estimates and the last 8 HF energy estimates. Once again, it will be understood that the present invention is not limited to a sliding window averaging technique, much less to any specific number of averaging samples. For example, those skilled in the art will understand that a weighted averaging technique could be used in lieu of the sliding window averaging technique. As shown at block 22, the average total energy, or Combined Energy, is used to calculate an energy scalar used to adjust the input signal to the desired energy level.

The DVSI IMBE specification recommends that the nominal root-mean square (RMS) speech level input be set to about −22 dBm0, where 0 dBm0 is defined to be approximately 3 dB below the onset of clipping of a sinusoidal waveform. It has been determined that in one exemplary embodiment this setting for the speech level provides sufficient margin to prevent the peaks of the speech waveform from being clipped when a signal is scaled up. This speech level is referred to as the Target Energy. This parameter determines the level that the AGC algorithm uses to set the scaled PCM input signal to the vocoder. The input signal is adjusted to the desired energy level through the calculation of the energy scalar. Block 22, i.e., the block designated as "Calculate Energy Scalar" allows to compute the energy scalar by dividing the combined average energy into the target energy constant.

$$EnergyScalar = \frac{Target\ Energy}{Combined\ Energy}$$

As shown at block 24, the energy scalar is then limited to a range between two limiting values:

(MinimumLinearScalar)^2 < EnergyScalar ≦ (MaximumLinearScalar)^2

When the Combined Energy value is greater than the Target Energy value, then the Energy Scalar is set to unity gain. When the Combined Energy value approaches zero the Energy Scalar is set to the maximum. In this exemplary embodiment, the Minimum Linear Scalar is limited to unity gain and the Maximum Linear Scalar is limited to a value of four (approximately 12 dB of gain). As will be appreciated by those skilled in the art, for LMR applications, in general, a loud audio level is preferred to a low audio level so scalars less than unity are typically not desired. Otherwise, the numerical computation of the ratio of the Target Energy over the Combined Energy is used to determine the value of the Energy Scalar, and this computation can vary, either raise or lower, the input speech level, within the above-identified limit values.

The Energy Scalar output from the limiter block 24 process is passed to a block 26, designated as "Feedback-Induced Noise Detect/Energy Scalar Adjustment". In LMR applications, audio feedback from a transmitting radio and a receiving radio on the same group being in close proximity is a probable event. The inventors of the present invention observed that under normal conditions, the LF energy level is generally higher than the HF energy level for human speech. However, when feedback-induced noise occurs, the level of HF energy increases dramatically. Block 26 allows detecting the presence of feedback-induced noise by comparing the respective high and low-frequency energy levels to one another. More particularly, OLE_LINK1 when the average HF energy is greater than the average LF energy, then the energy scalar is reduced OLE_LINK1. In one exemplary embodiment, the energy scalar in this case is reduced to a net gain of ¼. This reduction has been demonstrated to very effectively dampen out the feedback-induced noise. When the average LF energy is greater than the average HF energy, then the energy scalar is left as determined in block 24. That is, the energy scalar is not reduced, if there is no detection of high levels of HF energy. Block 28 allows converting the Energy Scalar, which, as will be readily understood by those skilled in the art, is based on a quadratic or squaring relationship of electrical parameters such as voltage and/or current, to a linear scalar that is used to scale the PCM input signal supplied to block 30. In one exemplary embodiment, the linear scalar is calculated as follows:

$$\text{LinearScalar} = \sqrt{\text{EnergyScalar}}$$

Figure 2:
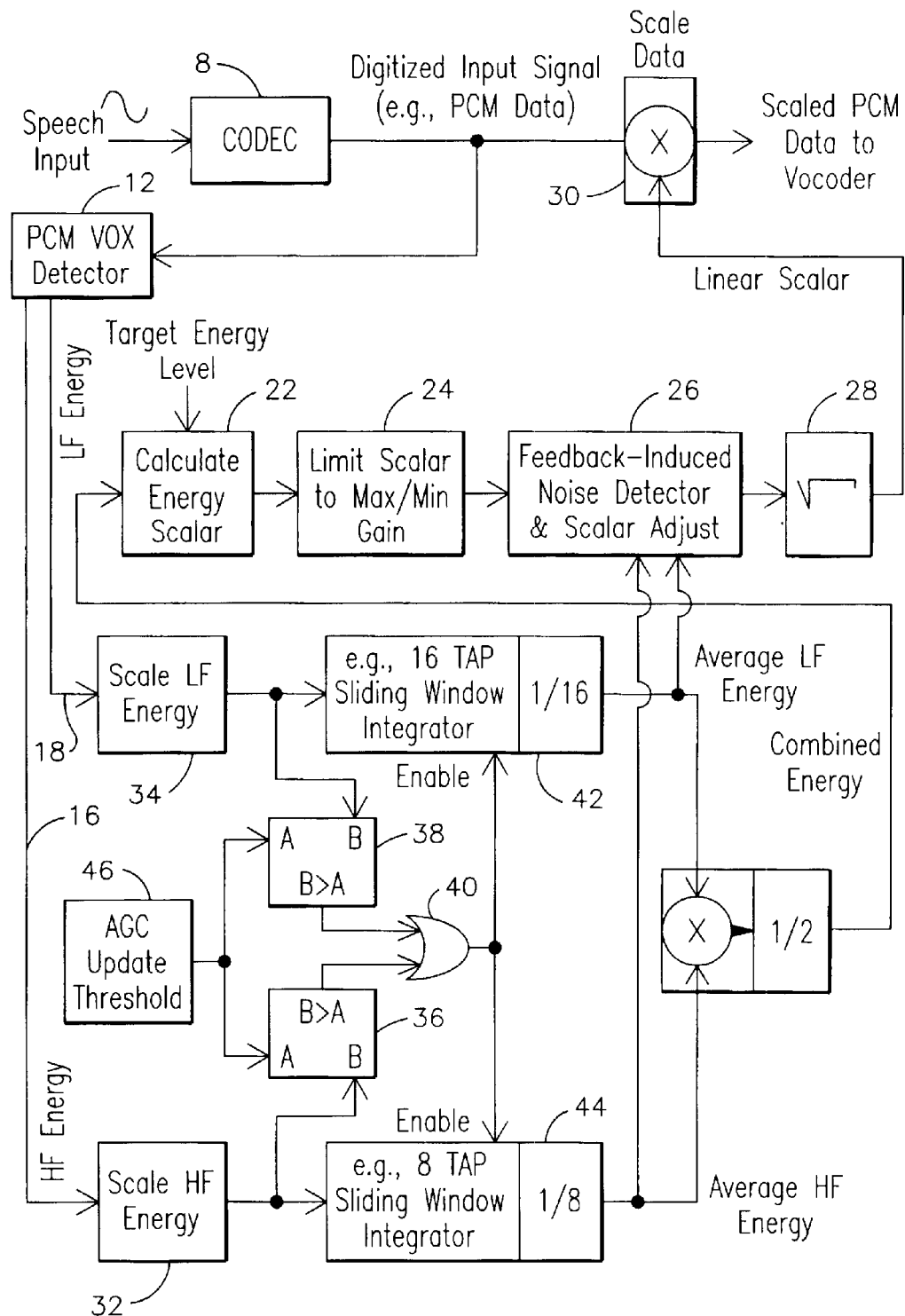
FIG. 2 shows a schematic representation illustrating further details of one embodiment of the automatic gain control circuit in accordance with aspects of the present invention.

The resulting linear scalar from block 28 is applied to block 30 to scale the PCM digital signal supplied by the CODEC device 8 (FIG. 2). This scaled signal comprises the output signal from the AGC circuit/process 10, which is then passed to subsequent stages of the Vocoder for further processing using techniques, which in addition to being well-understood by those skilled in the art, are of no consequence for the purposes of the present invention. In one exemplary embodiment, the energy scalar is adjusted on every 20 mSec of PCM samples of digitized speech. It will be understood that any of the various arithmetic and logical operations performed in the AGC circuit/process, in accordance with aspects of the present invention, may be performed through respective software modules as may be executed in a suitable signal processor, and such operations need not be executed through hardware modules. In one exemplary embodiment, the algorithm for practicing aspects of the present invention is implemented in a Texas Instrument TMS320C56 digital signal processor (DSP) integrated circuit (IC) chip.

FIG. 2 illustrates further details in connection with the AGC circuit/process of FIG. 1. Operational interrelationships already discussed in the context of FIG. 1 are identified in FIG. 2 with the same reference numeral shown in FIG. 1, and, for the sake of avoiding unnecessary redundancies; such interrelationships will not be repeated. FIG. 2 illustrates, respective energy scale modules 32 and 34, each respectively connected to comparator devices 36 and 38. In accordance, with another advantageous feature of the present invention, comparator devices 36 and 38 and a logical gate 40, such as an "OR" gate or equivalent, allow updating of the two averaging filters 42 and 44 only if either the LF energy value, or the HF energy value, or both, are greater than a minimum AGC threshold, such as may be stored in a memory device 46. In one exemplary embodiment, the AGC threshold is set to approximately 60 dBm0. This prevents the averaging filters from being updated based on signal levels that could otherwise being interpreted by the AGC circuit as needing boosting, when in fact such signal levels correspond to momentary periods of little or no speech production that normally occur in standard speech. For example, during a normal conversation, there are normally occurring pauses, such as may occur between phonemes, syllables, words, etc., or other momentary break periods that normally occur in typical speech production, irrespective of the language of the speaker. In the absence of the comparator and associated logic, the AGC circuit would interpret such momentary periods of little or no speech production as periods where the audio level needs boosting. It will be appreciated, however, that if the AGC were to provide such boosting, the AGC would be undesirably amplifying any residual noise that may be present at the source microphone. Further, once speech production resumed, there could be a brief period of time where the audio output could be distorted due to the boosting provided by the AGC circuit.

Table 1 below lists exemplary parameters that can be varied to optimize the algorithm for any given application. These parameters are listed below along with the values used in one exemplary embodiment.

TABLE 1

| | |
|---|---|
| Maximum gain | 4 |
| Minimum gain | 1 |
| Target energy | −22 dBm0 |
| Low frequency energy filter tap length | 16 |
| High frequency energy filter tap length | 8 |
| Filter initialization energy value | −28 dBm0 |
| Filter update threshold | −60 dBm0 |
| Feedback Noise control gain | 0.25 |

The present invention can be embodied in the form of computer-implemented processes and apparatus for practicing those processes. The present invention can also be embodied in the form of computer program code including computer-readable instructions embodied in tangible media, such as flash memory, floppy diskettes, CD-ROMs, hard drives, or any other computer-readable storage medium, wherein, when the computer program code is loaded into and executed by a computer, the computer, or digital signal processor, becomes an apparatus for practicing the invention. When implemented on a computer, the computer program code segments configure the computer to create specific logic circuits or processing modules.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

What is claimed is:

1. A method for reducing the level of feedback-induced noise in an output signal from an audio automatic gain control circuit in a radio transmitter, the method comprising:
   receiving a stream of pulses comprising an input signal to the automatic gain control circuit;
   receiving estimates of respective high and low frequency energy components of the input signal;
   averaging the respective high and low frequency components;
   calculating an energy scalar based on the ratio of a predefined target energy level over a combined value of the high and low frequency components;
   relating the target energy level to the combined value of the high and low frequency components;
   based on the relating results, limiting the calculated energy scalar to within two limit values;
   relating the values of the averages of the high and low frequency components to one another;
   if the value of the high frequency average exceeds the value of the low frequency average, reducing the energy scalar to a value sufficiently low to suppress the presence of feedback-induced noise in the input signal of the circuit, and generate an output signal with a corresponding low level of feedback-induced noise; and
   if the value of the low frequency average exceeds the value of the high frequency average, applying the energy scalar to the input signal to generate an output signal scaled within the two limit values.

2. The method of claim 1 further comprising providing an updating threshold, and relating the high and low frequency energy estimates to the updating threshold so that, when at least one of the high and low frequency energy estimates exceeds the updating threshold, the averaging of said high and low frequencies is enabled.

3. The method of claim 2 wherein when each of the high and low frequency energy estimates is below the updating threshold, the averaging of said high and low frequencies is disabled, at least until one of the high and low frequency estimates exceeds the updating threshold.

4. The method of claim 1 wherein the respective high and low frequency components are averaged over a respective sliding window.

5. The method of claim 4 where the sliding window for averaging the high frequency components is narrower relative to the sliding window for averaging the low frequency components.

6. A processor for reducing the level of feedback-induced noise in an output signal from an audio automatic gain control circuit in a radio transmitter, the processor comprising:
   at least one port for receiving a stream of pulses comprising an input signal to the automatic gain control circuit, and for receiving respective estimates of high and low frequency energy components of the input signal;
   an averaging module configured to average the respective high and low frequency components;
   a calculating module configured to calculate an energy scalar based on the ratio of a predefined target energy level over a combined value of the high and low frequency components;
   a comparator configured to relate the target energy level to the combined value of the high and low frequency components;
   a limiter responsive to the comparator to limit the calculated energy scalar to within two limit values;
   a comparator for relating the values of the averages of the high and low frequency components to one another; and
   a noise-reduction processing module responsive to the comparator for relating the values of the averages of the high and low frequency components to one another to perform the following actions:
      if the value of the high frequency average exceeds the value of the low frequency average, reducing the energy scalar from the limiter to a value sufficiently low to suppress the presence of feedback-induced noise in the input signal of the circuit, and generate an output signal with a corresponding low-level of feedback-induced noise; and
      if the value of the low frequency average exceeds the value of the high frequency average, applying the energy scalar value from the limiter to the input signal to generate an output signal scaled within the two limit values.

7. The processor of claim 6 further comprising memory configured to store an updating threshold, and a comparator for relating the high and low frequency energy estimates to the updating threshold so that, when at least one of the high and low frequency energy estimates exceeds the updating threshold, the averaging of said high and low frequencies is enabled.

8. The processor of claim 7 wherein when each of the high and low frequency energy estimates is below the updating threshold, the averaging of said high and low frequencies is disabled, at least until one of the high and low frequency estimates exceeds the updating threshold.

9. The processor of claim 6 wherein the respective high and low frequency components are averaged over a respective sliding window.

10. The processor of claim 9 wherein the sliding window for averaging the high frequency components is narrower relative to the sliding window for averaging the low frequency components.

11. A processor-readable medium including processor-executable code therein for reducing the level of feedback-induced noise in an output signal from an audio automatic gain control circuit by:
   receiving a stream of pulses comprising an input signal to the automatic gain control circuit;
   receiving estimates of respective high and low frequency energy components of the input signal;
   averaging the respective high and low frequency components;
   relating the values of the averages of the high and low frequency components to one another to determine the presence of feedback-induced noise;
   if the value of the high frequency average exceeds the value of the low frequency average, reducing the gain normally used by the automatic gain circuit to a value sufficiently low to suppress the presence of feedback-induced noise in the input signal of the circuit, and generate an output signal with a corresponding low level of feedback-induced noise; and
   if the value of the low frequency average exceeds the value of the high frequency average, generating an output signal based on the gain normally used by the automatic gain circuit in the absence of feedback-induced noise.

12. The processor-readable medium of claim 11 wherein the processor-executable code further allows for providing an updating threshold, and relating the high and low frequency energy estimates to the updating threshold so that, when at least one of the high and low frequency energy estimates exceeds the updating threshold, the averaging of said high and low frequencies is enabled.

13. The processor-readable medium of claim 11 wherein when each of the high and low frequency energy estimates is below the updating threshold, the averaging of said high and low frequencies is disabled, at least until one of the high and low frequency estimates exceeds the updating threshold.

14. The processor-readable medium of claim 11 wherein the respective high and low frequency components are averaged over a respective sliding window.

15. The processor-readable medium of claim 14 where the sliding window for averaging the high frequency components is narrower relative to the sliding window for averaging the low frequency components.

16. The processor-readable medium of claim 11 wherein the gain normally used by the automatic gain circuit in the absence of feedback-induced noise is determined by:

calculating an energy scalar based on the ratio of a predefined target energy level over a combined value of the high and low frequency components;

relating the target energy level to the combined value of the high and low frequency components; and based on the relating results, limiting the calculated energy scalar to within two limit values.

* * * * *